US012701487B2

(12) United States Patent
Bergström et al.

(10) Patent No.: US 12,701,487 B2
(45) Date of Patent: Aug. 4, 2026

(54) INDICATING HANDOVER-PERSISTENT RELEASE PREFERENCE

(71) Applicant: Telefonaktiebolaget LM Ericsson (publ), Stockholm (SE)

(72) Inventors: Mattias Bergström, Sollentuna (SE); Lian Araujo, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 18/578,791

(22) PCT Filed: Jun. 26, 2022

(86) PCT No.: PCT/EP2022/067463
§ 371 (c)(1),
(2) Date: Jan. 12, 2024

(87) PCT Pub. No.: WO2023/001491
PCT Pub. Date: Jan. 26, 2023

(65) Prior Publication Data
US 2024/0334294 A1      Oct. 3, 2024

Related U.S. Application Data

(60) Provisional application No. 63/223,289, filed on Jul. 19, 2021.

(51) Int. Cl.
*H04W 76/27* (2018.01)
*H04W 36/36* (2009.01)

(52) U.S. Cl.
CPC ......... *H04W 36/362* (2023.05); *H04W 76/27* (2018.02)

(58) Field of Classification Search
CPC .................................................. H04W 36/362
See application file for complete search history.

(56) References Cited

U.S. PATENT DOCUMENTS

2020/0077356 A1* 3/2020 Youn ..................... H04W 68/02

FOREIGN PATENT DOCUMENTS

WO      2023014254 A1      2/2023

OTHER PUBLICATIONS

"3GPP TS 33.401 V16.3.0", 3rd Generation Partnership Project; Technical Specification Group Services and System Aspects; 3GPP System Architecture Evolution (SAE); Security architecture (Release 16), Jul. 2020, pp. 1-170.

(Continued)

*Primary Examiner* — Myron Wyche
(74) *Attorney, Agent, or Firm* — Murphy, Bilak & Homiller, PLLC

(57) ABSTRACT

Embodiments include methods for a user equipment (UE) configured with user credentials for a plurality of public land mobile networks (PLMNs). Such methods include, while registered in first and second PLMNs and in a connected state for the first PLMN, transmitting to a first network node in the first PLMN a first indication that the UE wants to enter a reduced-energy state for the first PLMN. Such methods include initiating a timer upon transmitting the first indication, subsequently performing a handover to a second network node in the first PLMN, and performing one or more of the following: transmitting to the second network node a second indication that the UE wants to enter the reduced-energy state for the first PLMN; and stopping the timer. Other embodiments include complementary methods for the first and second network nodes, as well as UEs and network nodes configured to perform such methods.

20 Claims, 10 Drawing Sheets

(56) References Cited

OTHER PUBLICATIONS

"3GPP TS 38.331 V16.4.0", 3rd Generation Partnership Project; Technical Specification Group Radio Access Network; NR; Radio Resource Control (RRC) protocol specification (Release 16), Mar. 2021, pp. 1-949.
"3GPP TS 23.501 V16.9.0", 3rd Generation Partnership Project; Technical Specification Group Services and System Aspects; System architecture for the 5G System (5GS); Stage 2 (Release 16), Jun. 2021, pp. 1-452.
"Consideration on the Switching Notification Procedure", 3GPP TSG-RAN WG2 Meeting #114-e, Online, R2-2105165, May 19-27, 2021, pp. 1-8.
"Remaining Issues for NW switching with leaving RRC_Connected", 3GPP TSG-RAN WG2 Meeting #117-e, Online, R2-2202699, Feb. 21-Mar. 3, 2022, pp. 1-6.
"Summary of AI 8.3.3: UE notification on network switching for multi-SIM", 3GPP TSG-RAN WG2 Meeting #113bis-e, Online, R2-2104319, Apr. 12-20, 2021, pp. 1-14.

* cited by examiner

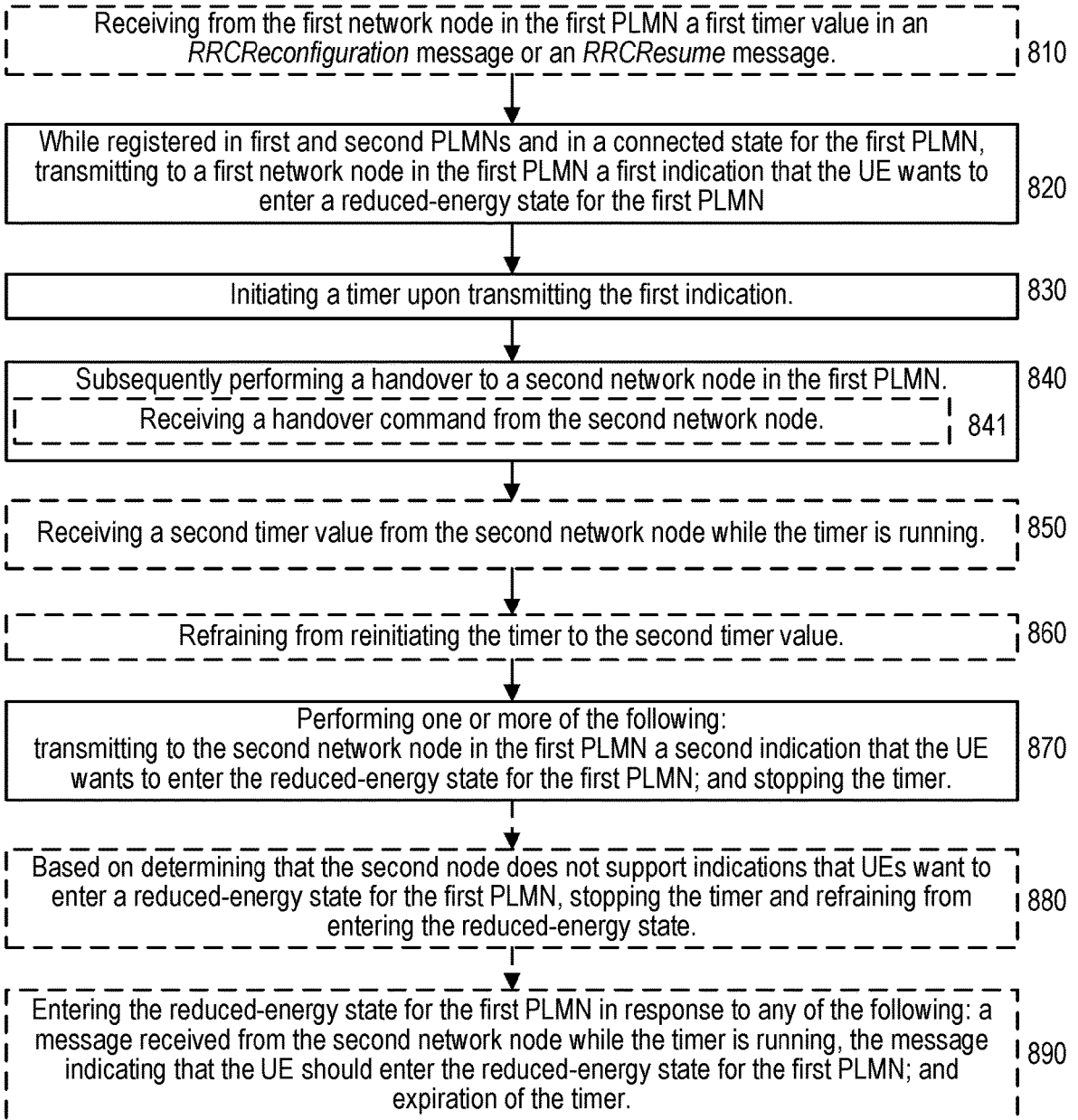

Receiving from the first network node in the first PLMN a first timer value in an *RRCReconfiguration* message or an *RRCResume* message.    810

While registered in first and second PLMNs and in a connected state for the first PLMN, transmitting to a first network node in the first PLMN a first indication that the UE wants to enter a reduced-energy state for the first PLMN    820

Initiating a timer upon transmitting the first indication.    830

Subsequently performing a handover to a second network node in the first PLMN.    840
Receiving a handover command from the second network node.    841

Receiving a second timer value from the second network node while the timer is running.    850

Refraining from reinitiating the timer to the second timer value.    860

Performing one or more of the following:
transmitting to the second network node in the first PLMN a second indication that the UE wants to enter the reduced-energy state for the first PLMN; and stopping the timer.    870

Based on determining that the second node does not support indications that UEs want to enter a reduced-energy state for the first PLMN, stopping the timer and refraining from entering the reduced-energy state.    880

Entering the reduced-energy state for the first PLMN in response to any of the following: a message received from the second network node while the timer is running, the message indicating that the UE should enter the reduced-energy state for the first PLMN; and expiration of the timer.    890

*FIG. 8*

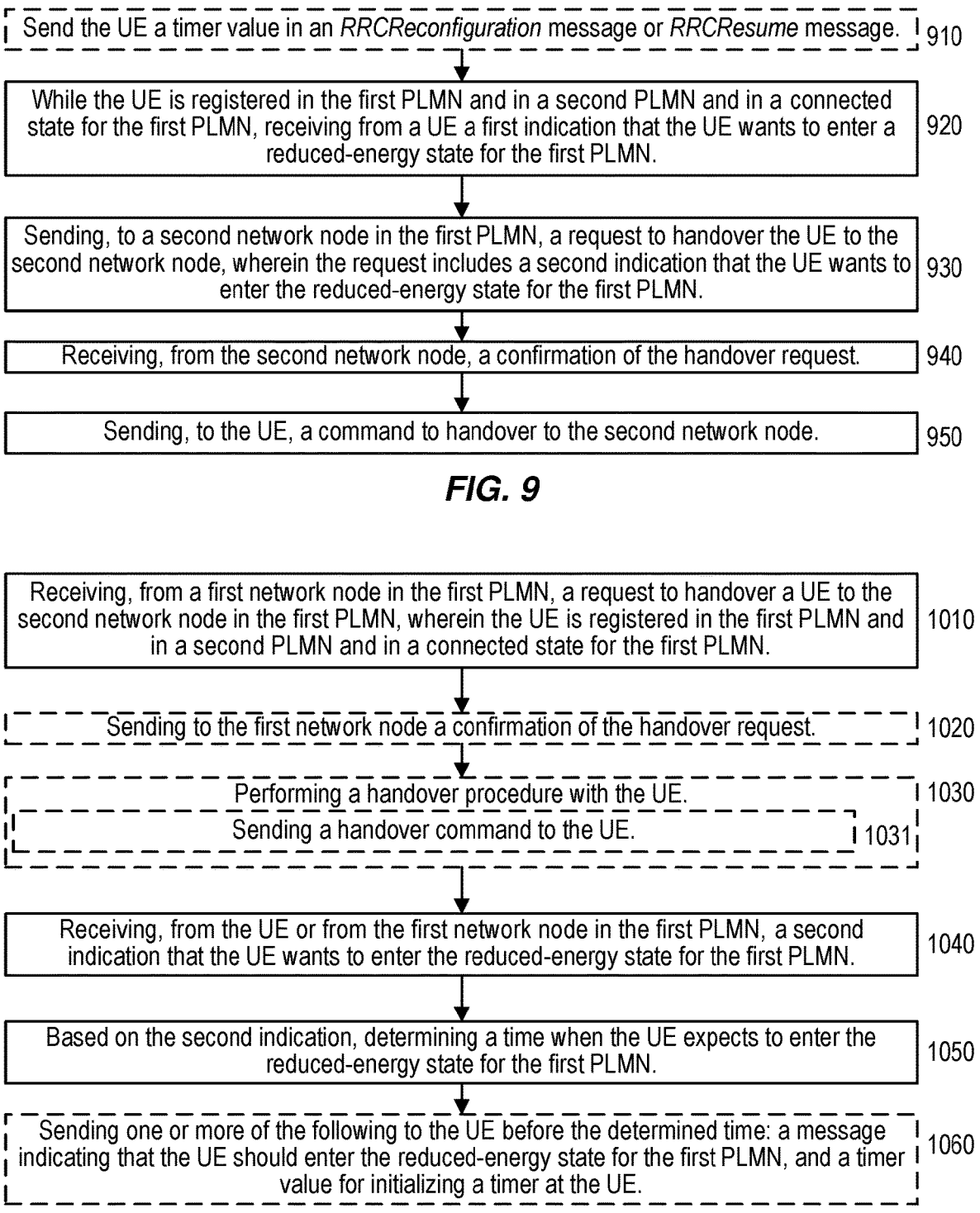

Send the UE a timer value in an *RRCReconfiguration* message or *RRCResume* message. — 910

While the UE is registered in the first PLMN and in a second PLMN and in a connected state for the first PLMN, receiving from a UE a first indication that the UE wants to enter a reduced-energy state for the first PLMN. — 920

Sending, to a second network node in the first PLMN, a request to handover the UE to the second network node, wherein the request includes a second indication that the UE wants to enter the reduced-energy state for the first PLMN. — 930

Receiving, from the second network node, a confirmation of the handover request. — 940

Sending, to the UE, a command to handover to the second network node. — 950

*FIG. 9*

Receiving, from a first network node in the first PLMN, a request to handover a UE to the second network node in the first PLMN, wherein the UE is registered in the first PLMN and in a second PLMN and in a connected state for the first PLMN. — 1010

Sending to the first network node a confirmation of the handover request. — 1020

Performing a handover procedure with the UE. — 1030
Sending a handover command to the UE. — 1031

Receiving, from the UE or from the first network node in the first PLMN, a second indication that the UE wants to enter the reduced-energy state for the first PLMN. — 1040

Based on the second indication, determining a time when the UE expects to enter the reduced-energy state for the first PLMN. — 1050

Sending one or more of the following to the UE before the determined time: a message indicating that the UE should enter the reduced-energy state for the first PLMN, and a timer value for initializing a timer at the UE. — 1060

*FIG. 10*

INDICATING HANDOVER-PERSISTENT RELEASE PREFERENCE

TECHNICAL FIELD

The present disclosure relates generally to wireless networks and more specifically to techniques for managing user equipment (UEs) configured with multiple user subscriptions to different public land mobile networks (PLMNs).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that can communicate with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Currently the fifth generation ("5G") of cellular systems, also referred to as New Radio (NR), is being standardized within the Third-Generation Partnership Project (3GPP). NR is developed for maximum flexibility to support multiple and substantially different use cases but shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. In addition to RRC_IDLE and RRC_CON-NECTED, the NR RRC layer also includes an RRC_INAC-TIVE state with properties similar to the "suspended" condition in LTE Rel-13.

3GPP is currently studying how to best support UEs that can manage two or more concurrent subscriptions to different public land mobile networks (PLMNs), e.g., with multiple subscriber identity modules (i.e., Multi-SIM or MUSIM). A single UE having two or more subscriber credentials can "act" as different UE's according to which subscription is active at any given time. Even though certain UEs may have some of these capabilities, most operations are not optimized and there is currently no 3GPP-standardized support for multi-SIM.

One exemplary scenario is a UE in RRC_CONNECTED state in a second PLMN (i.e., to which the user subscribes) must perform operations in a first PLMN, such as listen to paging, broadcast SI acquisition, cell reselection, etc. There are two possible procedures that the UE can follow in this scenario. The first is known as "RRC switching procedure without leaving RRC_CONNECTED," such as when the UE listens to paging in first PLMN during short periods and then shortly switches back to second PLMN, while remaining in RRC_CONNECTED state in the second PLMN during the operation in the first PLMN.

SUMMARY

The second procedure is known as "RRC switching procedure for leaving RRC_CONNECTED," such as when the UE initiates a service in first PLMN (e.g., responding to paging) and cannot shortly switch back to second PLMN. This causes the UE to leave RRC_CONNECTED state in the second PLMN. There can be various problems, issues, and/or difficulties when the UE leaves RRC_CONNECTED state in the second PLMN in this manner.

Embodiments of the present disclosure provide specific improvements to operation of MUSIM-capable UEs in wireless networks, such as by facilitating solutions to overcome exemplary problems summarized above and described in more detail below.

Embodiments of the present disclosure include methods (e.g., procedures) for a UE (e.g., wireless device) configured with user credentials for a plurality of public land mobile networks (PLMNs).

These exemplary methods can include, while registered in first and second PLMNs and in a connected state for the first PLMN, transmitting to a first network node in the first PLMN a first indication that the UE wants to enter a reduced-energy state for the first PLMN. These exemplary methods can also include initiating a timer upon transmitting the first indication and subsequently performing a handover to a second network node in the first PLMN. These exemplary methods can also include performing one or more of the following:

transmitting to the second network node in the first PLMN a second indication that the UE wants to enter the reduced-energy state for the first PLMN; and stopping the timer.

In some embodiments, the reduced-energy state for the first PLMN is one of the following: RRC_IDLE; RRC_I-

NACTIVE; or RRC_IDLE with stored context. In some embodiments, at least one of the first indication and the second indication is included in a UEAssistanceInformation message.

In some embodiments, these exemplary methods can also include receiving, from the first network node in the first PLMN, a timer value in an RRCReconfiguration message or an RRCResume message. The timer is initiated to the received timer value. In some embodiments, the timer value can be included in a series of nested information elements for a multi-SIM configuration.

In some embodiments, these exemplary methods can also include entering the reduced-energy state for the first PLMN in response to any of the following: expiration of the timer, or a message received from the second network node while the timer is running. More specifically, the message indicates that the UE should enter the reduced-energy state for the first PLMN.

In some embodiments, these exemplary methods can also include receiving a timer value from the second network node while the timer is running, and refraining from reinitiating the timer based on the timer value received from the second network node.

In some embodiments, these exemplary methods can also include, based on determining that the second network node does not support indications that UEs want to enter a reduced-energy state for the first PLMN, stopping the timer and refraining from entering the reduced-energy state. In some embodiments, determining that the second network node does not support indications that UEs want to enter a reduced-energy state for the first PLMN can be based on one of the following: a message received from the second network node during the handover; or a message received from the second network in response to the second indication.

In some embodiments, performing the handover can include receiving a handover command from the second network node. In such embodiments, transmitting the second indication can be based on the period between transmitting the first indication and receiving the handover command being less than a threshold.

In some embodiments, the first indication indicates that it is an initial indication that the UE wants to enter a reduced-energy state for the first PLMN, and the second indication indicates that it is a subsequent indication that the UE wants to enter a reduced-energy state for the first PLMN.

Other embodiments include methods (e.g., procedures) for a first network node (e.g., base station, eNB, gNB, ng-eNB, en-gNB, etc.) configured to operate in a first PLMN and to manage a UE configured with user credentials for a plurality of PLMNs.

These exemplary methods can include, while the UE is registered in the first PLMN and in a second PLMN, and in a connected state for the first PLMN, receiving from the UE a first indication that the UE wants to enter a reduced-energy state for the first PLMN. These exemplary methods can also include sending, to a second network node in the first PLMN, a request to handover the UE to the second network node. The request includes a second indication that the UE wants to enter the reduced-energy state for the first PLMN. These exemplary methods can also include receiving from the second network node a confirmation of the handover request and sending to the UE a command to handover to the second network node.

In some embodiments, the reduced-energy state for the first PLMN is one of the following: RRC_IDLE; RRC_I-NACTIVE; or RRC_IDLE with stored context. In some embodiments, the first indication can be included in a UEAssistanceInformation message.

In some embodiments, these exemplary methods can also include sending the UE a timer value in an RRCReconfiguration message or an RRCResume message. In some embodiments, the timer value can be included in a series of nested information elements for a multi-SIM configuration.

Other embodiments include methods (e.g., procedures) for a second network node (e.g., base station, eNB, gNB, ng-eNB, en-gNB, etc.) configured to operate in a first PLMN and to manage a UE configured with user credentials for a plurality of PLMNs.

These exemplary methods can include receiving, from a first network node in the first PLMN, a request to handover the UE to the second network node in the first PLMN. The UE is registered in the first PLMN and in a second PLMN and in a connected state for the first PLMN. These exemplary methods can also include receiving, from the UE or from the first network node in the first PLMN, a second indication that the UE wants to enter the reduced-energy state for the first PLMN. These exemplary methods can also include, based on the second indication, determining a time when the UE expects to enter the reduced-energy state for the first PLMN.

In some embodiments, these exemplary methods can also include sending one or more of the following to the UE before the determined time: a timer value for initializing a timer at the UE, and a message indicating that the UE should enter the reduced-energy state for the first PLMN.

In some embodiments, the reduced-energy state for the first PLMN is one of the following: RRC_IDLE; RRC_INACTIVE; or RRC_IDLE with stored context.

In some embodiments, the second indication can be received from the first network node with the handover request. In other embodiments, these exemplary methods can also include sending to the first network node a confirmation of the handover request and performing a handover procedure with the UE. In such embodiments, the second indication can be received from the UE after completion of the handover procedure. In some of these embodiments, the second indication can be included in a UEAssistanceInformation message.

In some of these embodiments, performing the handover procedure with the UE can include sending a handover command to the UE. In such embodiments, the second indication can be received from the UE based on the period between the following being less than a threshold: the UE's transmission to the first network node of a first indication that the UE wants to enter a reduced-energy state for the first PLMN, and the UE's reception of the handover command.

In various embodiments, the second indication indicates one of the following:

a time remaining on a timer running at the UE, an initial value for the timer that was configured by the first network node, a time since the UE sent the first network node a first indication that the UE wants to enter the reduced-energy state for the first PLMN, or an absolute time when the UE expects to enter the reduced-energy state for the first PLMN.

In some embodiments, the second network node can indicate to the UE that the second network node supports indications that UEs want to enter a reduced-energy state for the first PLMN, based on one of the following: a message sent to the UE during the handover, or a message sent to the UE in response to the second indication received from the UE.

Other embodiments include UEs (e.g., wireless devices, IoT devices, etc. or component(s) thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can avoid and/or prevent misunderstandings and/or state mismatches between UEs and network nodes after handovers, which can facilitate correct and efficient operation of UEs and networks. In this manner, embodiments can reduce or prevent loss of user data and/or excess latency for a UE to receive and respond to network paging, which can happen when such misunderstandings and/or state mismatches occur.

These and other objects, features, and advantages of embodiments of the present disclosure will become apparent upon reading the following Detailed Description in view of the Drawings briefly described below.

BRIEF DESCRIPTION OF THE DRAWINGS

FIG. 8 is a flow diagram of an exemplary method (e.g., procedure) for a UE (e.g., wireless device, IoT device, etc. or component(s) thereof), according to various embodiments of the present disclosure.

FIG. 9 is a flow diagram of an exemplary method (e.g., procedure) for a first network node (e.g., eNB, gNB, ng-eNB, en-gNB, etc. or component(s) thereof), according to various embodiments of the present disclosure.

FIG. 10 is a flow diagram of an exemplary method (e.g., procedure) for a second network node (e.g., eNB, gNB, ng-eNB, en-gNB, etc. or component(s) thereof), according to various embodiments of the present disclosure.

DETAILED DESCRIPTION

Figure 1:
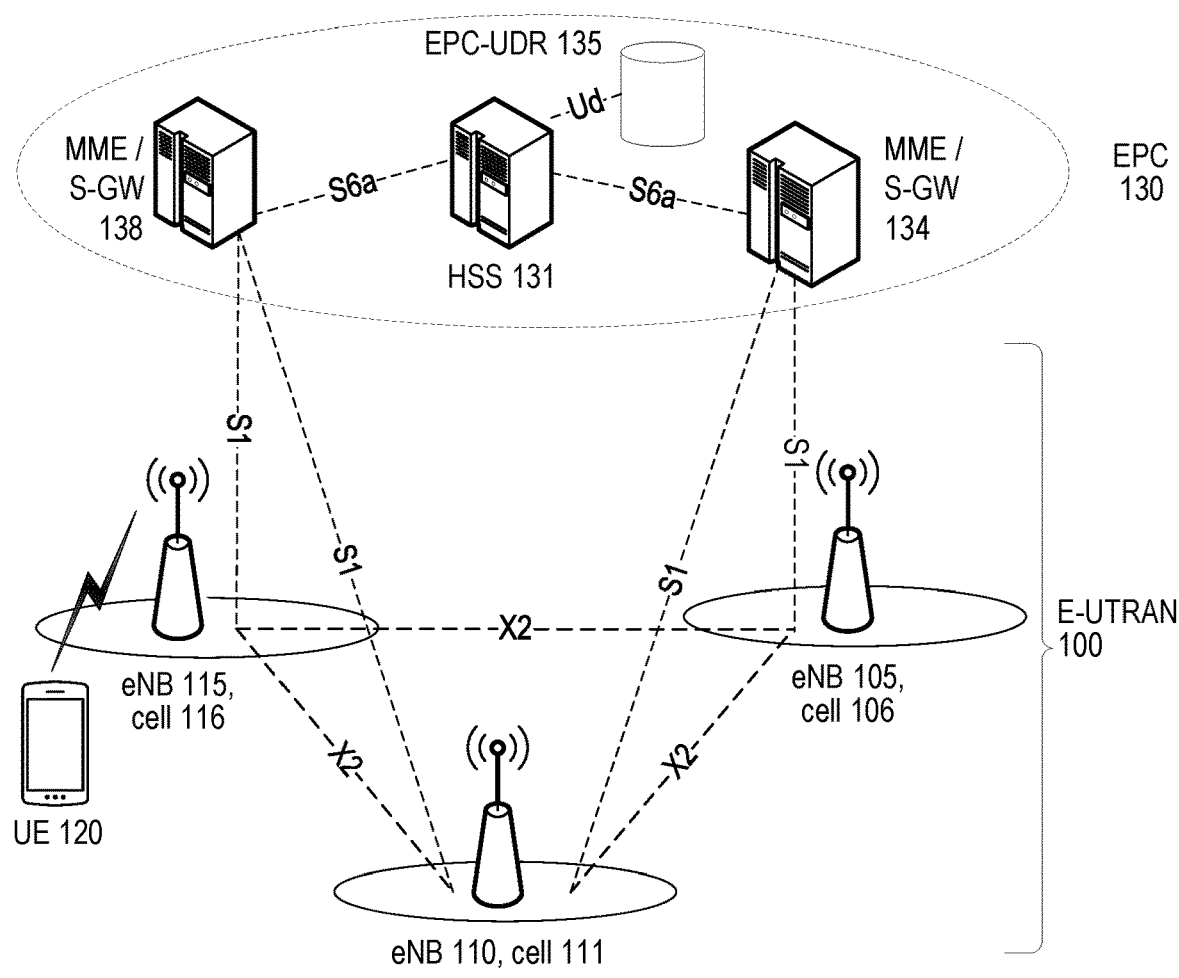
FIG. 1 shows a high-level view of an exemplary LTE network architecture.
Figure 2:
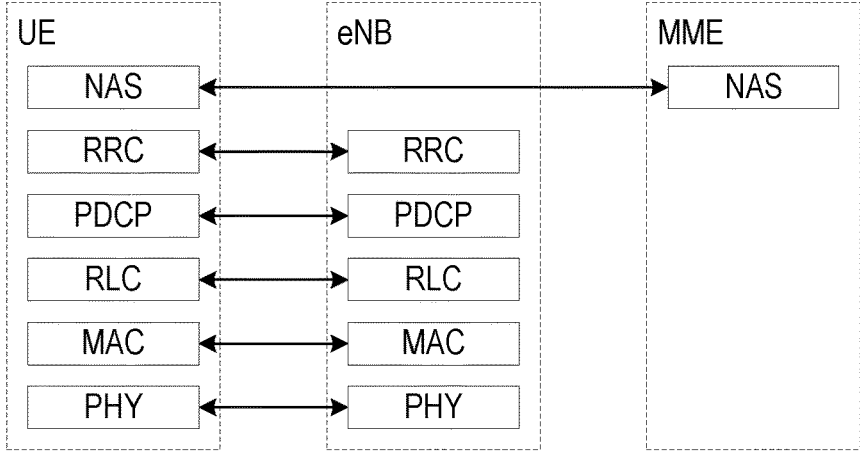
FIG. 2 shows an exemplary configuration of an LTE control plane (CP) protocol stack.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IOT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network. Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 3:
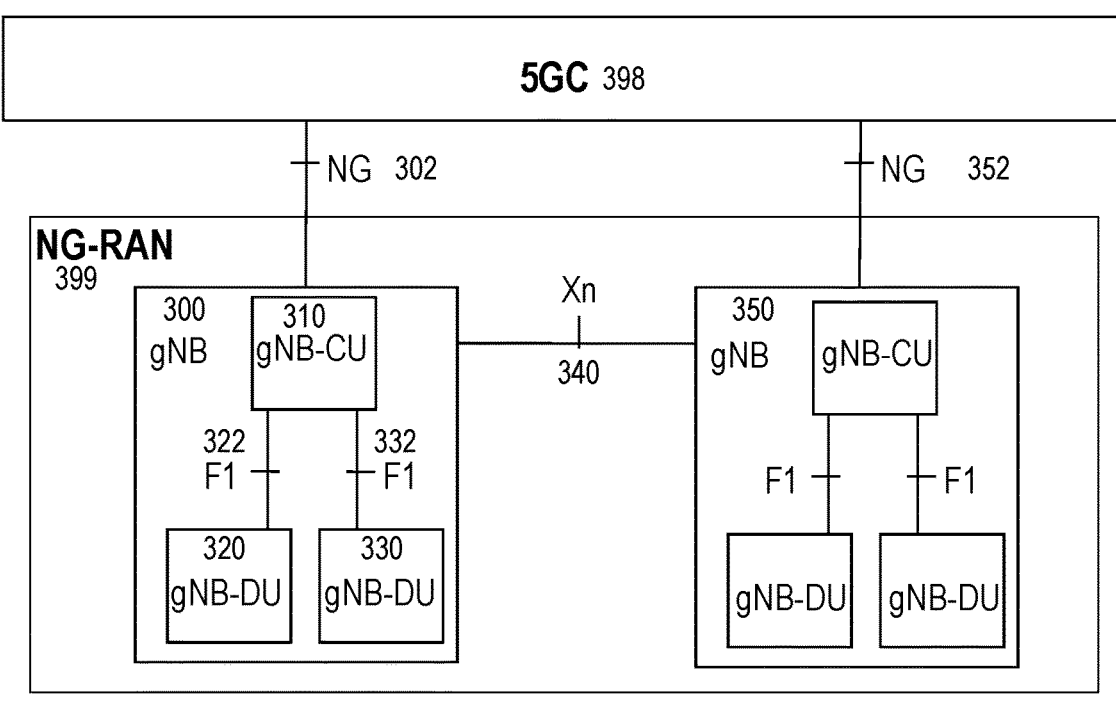
FIGS. 3-4 show high-level views of exemplary 5G/NR network architectures.

FIG. 3 illustrates a high-level view of an exemplary 5G network architecture, consisting of a Next Generation RAN (NG-RAN 399) and a 5G Core (5GC 398). NG-RAN 399 can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. Each of the gNBs can support frequency division duplexing (FDD), time division duplexing (TDD), or a combination thereof on the NR interface to UEs.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 3 include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry.

A gNB-CU connects to its associated gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
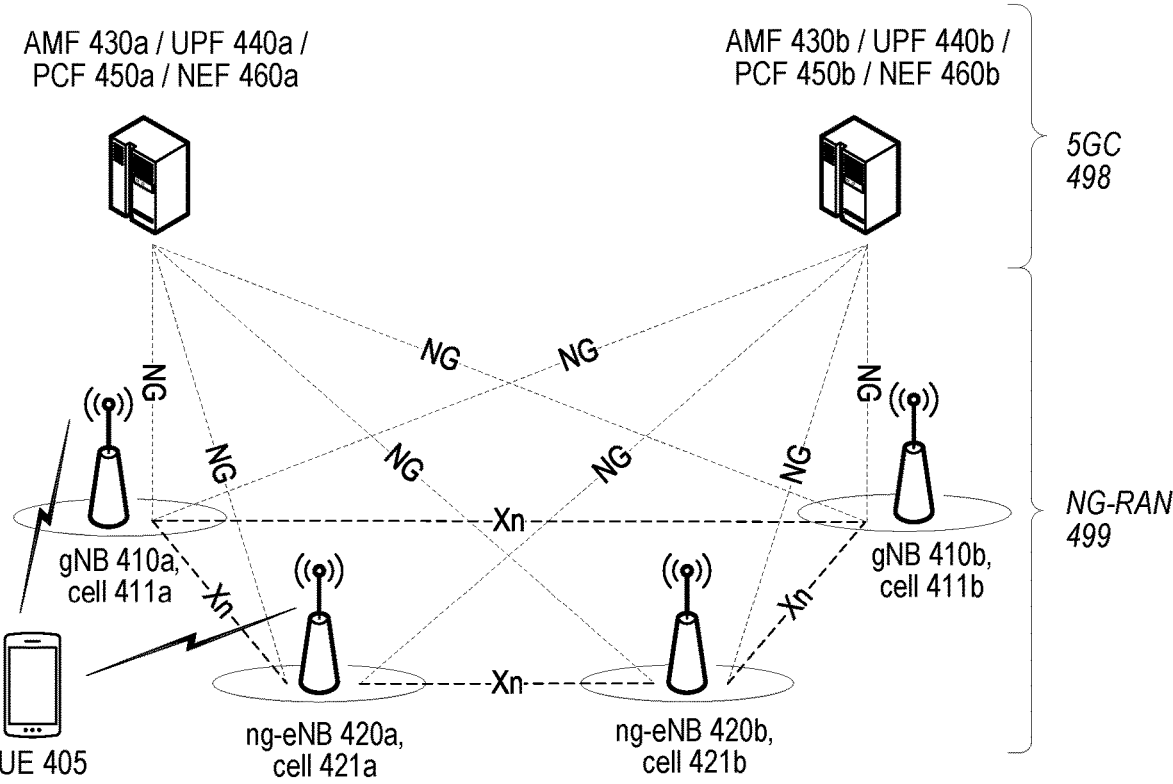

FIG. 4 shows another high-level view of an exemplary 5G network architecture, including NG-RAN 499 and 5GC 498. As shown in the figure, NG-RAN 499 can include gNBs (e.g., 410*a,b*) and ng-eNBs (e.g., 420*a,b*) that are interconnected with each other via respective Xn interfaces. The gNBs and ng-eNBs are also connected via the NG interfaces to 5GC 498, more specifically to Access and Mobility Management Functions (AMFs, e.g., 430*a,b*) via respective NG-C interfaces and to User Plane Functions (UPFs, e.g., 440*a,b*) via respective NG-U interfaces. Moreover, the AMFs can communicate with one or more policy control functions (PCFs, e.g., 450*a,b*) and network exposure functions (NEFs, e.g., 460*a,b*).

Each of the gNBs can support the NR radio interface including FDD, TDD, or a combination thereof. In contrast, each of ng-eNBs can support the LTE radio interface but, unlike conventional LTE eNBs (e.g., in FIG. 1), connect to the 5GC via the NG interface. Each or gNB or ng-eNB can serve a geographic coverage area including one more cells, such as cells 411*a-b* and 421*a-b* shown in FIG. 4. Depending on the particular cell in which it is located, a UE 405 can communicate with the gNB or ng-eNB serving that cell via the NR or LTE radio interface, respectively.

In some embodiments, the gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

As briefly mentioned above, 3GPP is currently studying how to best support UEs that can manage two or more concurrent subscriptions to different public land mobile networks (PLMNs), e.g., with multiple subscriber identity modules (i.e., Multi-SIM or MUSIM). A single UE having two or more subscriber credentials can "act" as different UE's according to which subscription is active at any given time. Even though certain UEs may have some of these capabilities, most operations are not optimized and there is currently no 3GPP-standardized support for multi-SIM.

One possible improvement is an easier switch between states related to use of a first subscription to a first PLMN (with user credentials in a first USIM) and states related to use of a second subscription to a second PLMN (with user credentials in a second USIM). This can be particularly important when such states are dependent, e.g., CM-Connected in first and second PLMNs. Such switching may be straightforward, or even unnecessary, if the UE has the capability of communicating simultaneously with the first and second PLMNs using the first and second USIMs. This may require at least dual receiver and transmitter chains, frequencies that are used towards both networks don't interfere with each other, and radio separation is good enough to avoid interference (e.g., intermodulation, IM, effects) within the UE itself.

For UEs that cannot simultaneously communicate with two PLMNs in this manner, another possible approach is to introduce signaling that allows a UE to at least signal a network that it is leaving, or becoming unreachable for, a particular PLMN. One exemplary scenario is a UE in RRC_CONNECTED state in a second PLMN (i.e., to which the user subscribes) has to perform operations in a first PLMN, such as listen to paging, broadcast SI acquisition, cell reselection, etc.

There are two possible procedures that the UE can follow in this scenario. The first is known as "RRC switching procedure without leaving RRC_CONNECTED," such as when the UE listens to paging in a second PLMN during short periods and then shortly switches back to a first PLMN, while remaining in RRC_CONNECTED state in the first PLMN during the operation in the second PLMN. The second is known as "RRC switching procedure for leaving RRC_CONNECTED," such as when the UE initiates a service in a second PLMN (e.g., responding to paging) and thus cannot shortly switch back to a first PLMN, causing the UE to leave RRC_CONNECTED state in the first PLMN.

3GPP RAN2 working group has reached the following agreements on various switching-related issues:

Switching procedure can be used to notify the first PLMN ("network A") that the UE has a preference to leave RRC_CONNECTED state in network A.

Switching procedure can be used to notify network A that the UE has a preference to be kept in RRC_CONNECTED state in network A while temporarily switching to the second PLMN ("network B").

RRC signaling is used for switching procedure without leaving RRC_CONNECTED state in network A for UE temporarily switching to network B as a baseline. Need for additional MAC signaling is for further study (FFS).

During switching procedure for leaving RRC_CONNECTED state, the UE is allowed to enter RRC_IDLE state if it does not receive response message from the network within a certain configured time period. This issue is FFS for RRC_INACTIVE state.

Access stratum (AS)-based solution for network switching includes two steps:

If configured, UE can send an RRC message to leave RRC_CONNECTED for MUSIM purpose, and gNB may release the UE to RRC_IDLE/RRC_INACTIVE.

For the RRC switching procedure for leaving RRC_CONNECTED, the UE may be configured with a "leaving time period", such that when the leaving time period is over, the UE may enter RRC_IDLE state even without having received an RRCRelease message from the first PLMN (or network B). Additionally, the UE may autonomously leave the first PLMN at the leaving time period after the UE has sent a request to leave that network, even if the first PLMN has not released the UE by the end of that period.

Even so, there are some situations where these existing arrangements may not work properly. For example, a UE may send an indication to a first network node (e.g., gNB) that it prefers to be released to RRC_IDLE or to RRC_I-

NACTIVE. Subsequently, the UE may be handed over to a second network node in the course of normal mobility operations. However, this release preference information does not get conveyed to the second network node, which will not know if, or when, the UE will leave the first PLMN that includes the first and second network nodes.

Accordingly, embodiments of the present disclosure provide techniques whereby a MUSIM UE, being simultaneously registered in first and second PLMNs, having corresponding first and second USIMs, prefers to leave the first PLMN to instead connect to a second PLMN. The UE can send a release preference indication to a first network node (or source node) in the first PLMN, which subsequently hands over the UE to a second network node (or target node) in the first PLMN. Either the UE or the first network node can inform the second network node of the UE's release preference, and the second network node can act upon that information accordingly.

Other embodiments also include techniques for the UE when the target node does not configure the UE release preference indication. Other embodiments include techniques for the UE to manage (e.g., abort) a planned release procedure upon occurrence of a handover.

Although embodiments are described in the context of handover from source node to target node, the underlying principles are also applicable to handover from a source cell to a target cell served by a single network node.

Embodiments of the present disclosure can provide various benefits, advantages, and/or solutions to problems described herein. For example, embodiments can avoid and/or prevent misunderstandings and/or state mismatches between UEs and serving network nodes after handovers, which can facilitate correct and efficient network operation.

Embodiments of the present disclosure will now be described in more detail. In this description, the term "MUSIM UE" will refer to a UE that is registered concurrently in multiple PLMNs, e.g., based on corresponding multiple USIMs storing respective user credentials. In some instances, the MUSIM UE may be referred to more simply as "UE".

The term "first PLMN" will refer to a network in which the MUSIM UE is registered and is in a connected or normal-energy state (e.g., RRC_CONNECTED or state with similar properties), but for which the MUSIM UE wants to enter a reduced-energy state (e.g., RRC_INACTIVE, RRC_IDLE, or state with similar properties). Likewise, the term "second PLMN" will refer to another network in which the MUSIM UE is registered concurrently with its registration in the first PLMN.

In some embodiments (referred to as "network-centric approach"), the MUSIM UE can transmit a release preference indication to a first network node (or source node) serving the UE. Subsequently, if the first network node has not yet released the UE, the first network node initiates a handover procedure for the UE to a second network node. The first network node sends to the second network node an indication of a release preference indication received from the UE. This release preference indication can be sent from the first network node to the second network node in a handover preparation procedure.

In some embodiments, the release preference indication may not only indicate the UE's preference to leave the first PLMN, but it may also include information about time when the UE is expected to leave the first PLMN. This may be indicated by saying how much time remains until the UE will leave the first PLMN. Another approach is to indicate how long time it was since the UE sent the first release preference. Another approach is to indicate an absolute time when the UE will leave the first PLMN, e.g., a time of day.

Upon receiving this information, the second network node assumes that the UE will leave the first PLMN after the time indicated by the first network node. The second network node may release the UE before the indicated time; if not, both the second network node and the UE have a consistent understanding that the UE can autonomously leave the network after that time.

Figure 5:
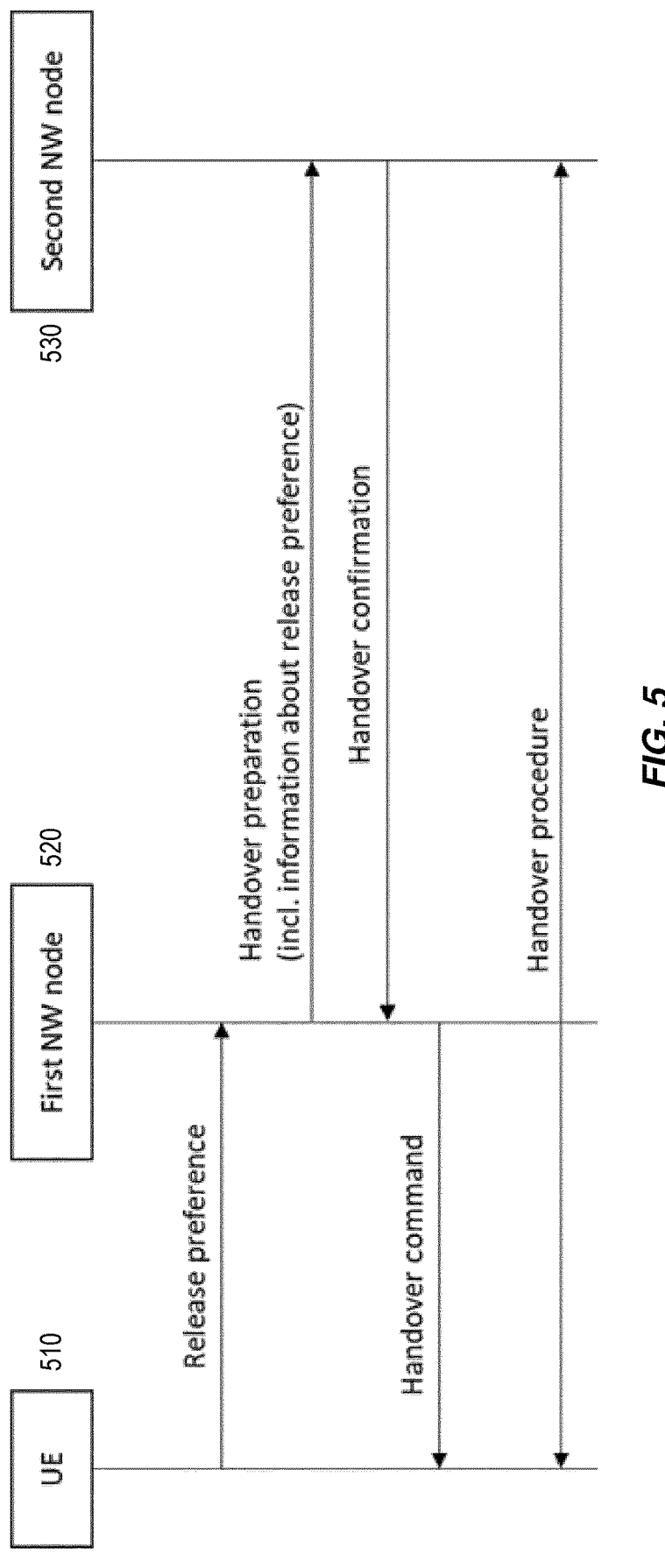
FIG. 5 is a signal flow diagram for an exemplary network-centric technique according to some embodiments of the present disclosure.

FIG. 5 is a signaling diagram for an exemplary network-centric approach according to these embodiments. Specifically, FIG. 5 shows signaling between a UE (510), a first network node (520), and a second network node (530).

Initially, the UE sends a release preference indication to the first network node (or source node). The first network node sends a handover preparation message to the second network node. The handover preparation message includes release preference information for the UE, which can include and/or be derived from the release preference indication received from the UE. The second network node then confirms the requested handover, causing the first network node to send a handover command to the UE. The second network node and UE then perform the handover procedure, after which the UE is served by the second network node.

As a specific example, if the UE sent the release preference indication at T=0 and the first network node sent the handover preparation message at T=0.5 seconds, the release preference information may include a time T=0.5, representing the time since the UE sent the release preference indication to the first network node.

In some embodiments, the second network node may subsequently handover the UE to a third network node. The second network node may send release preference information for the UE. This release preference information sent to the third node may be based on a release preference indication the second network node received from the UE or it may be based on the release preference information from the first network node, discussed above. The principles of these embodiments can be further extended to additional subsequent handovers.

In other embodiments (referred to as "UE-centric approach"), the MUSIM UE can transmit a release preference indication to a first network node (or source node) serving the UE. Subsequently, if the first network node has not yet released the UE, the first network node initiates a handover procedure for the UE to a second network node. After handover, the UE sends a second release preference indication to the second network node. Upon receiving this information, the second network node assumes that the UE will leave (i.e., release the connection to) the first PLMN after a time indicated by the UE in the release preference indication. The second network node may release the UE before the indicated time; if not, both the second network node and the UE have a consistent understanding that the UE can autonomously leave the network after that time. The principles of these embodiments can be further extended to additional subsequent handovers of the UE.

In some embodiments, the release preference indication may not only indicate the UE's preference to leave the first PLMN, but it may also include information about time when the UE is expected to leave the first PLMN. This may be indicated by saying how much time remains until the UE will leave the first PLMN. Another approach is to indicate how long time it was since the UE sent the first release preference. Another approach is to indicate an absolute time when the UE will leave the first PLMN, e.g., a time of day.

Figures 6, 7:
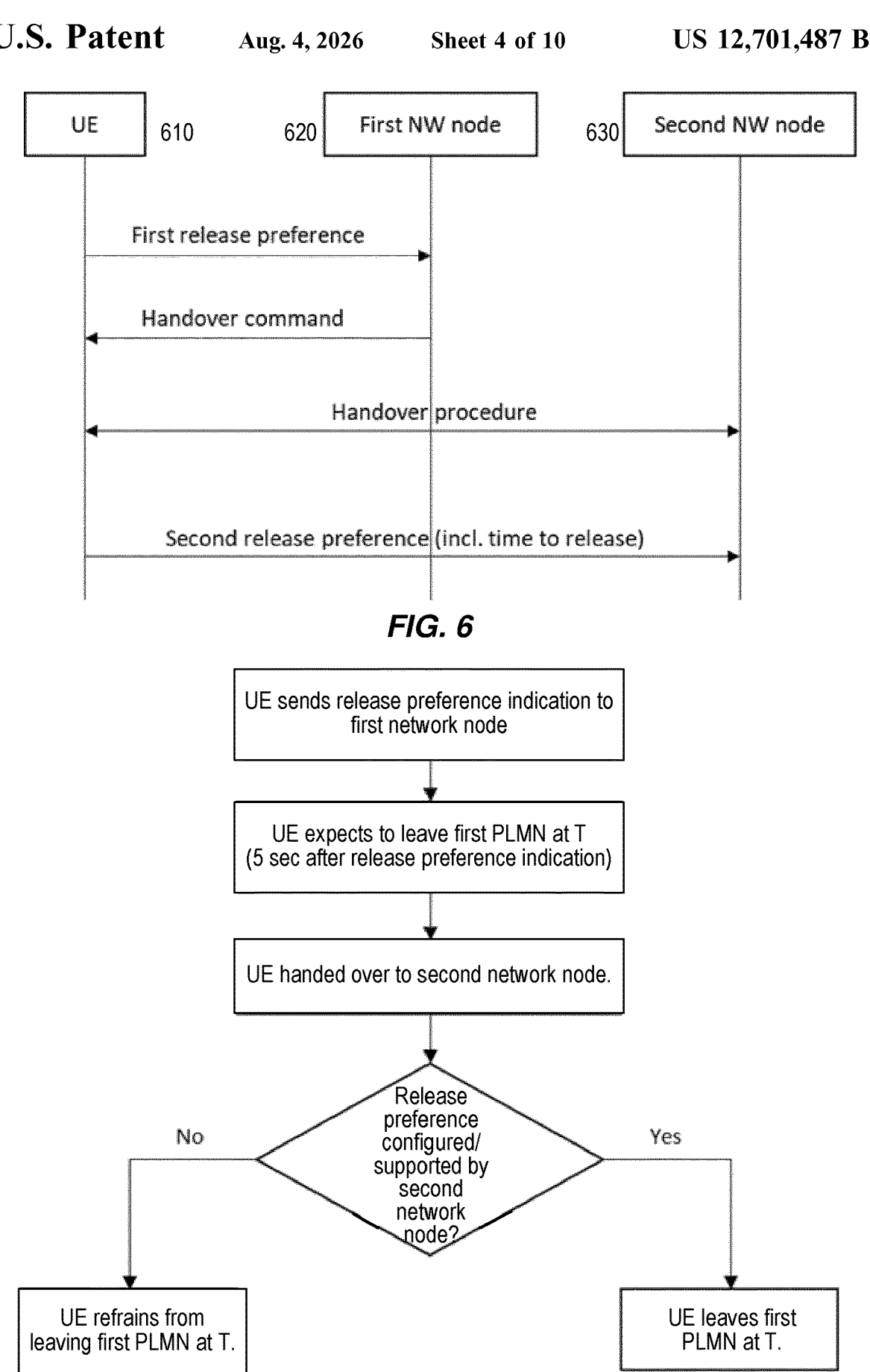
FIG. 6 is a signal flow diagram for an exemplary UE-centric technique according to other embodiments of the present disclosure.
FIG. 7 is a flow diagram for an exemplary procedure for a UE conditional release from a first PLMN, according to various embodiments of the present disclosure.

FIG. 6 is a signal flow diagram for an exemplary UE-centric approach according to these embodiments of the present disclosure. In particular, FIG. 6 shows signaling between a UE (610), a first network node (620), and a second network node (630).

Initially, the UE sends a first release preference indication to the first network node (or source node). Although not shown, the first network node may send a handover preparation message to the second network node. The second network node may then confirm the requested handover, causing the first network node to send a handover command to the UE. The second network node and UE then perform the handover procedure, after which the UE is served by the second network node. Subsequently, the UE sends a second release preference indication to the second network node. The second release preference indication can include a time when the UE expects to release from the first PLMN.

A network node may not know whether a particular release preference indication received from the UE is an initial (or first) release preference or a subsequent (e.g., second, third, etc.) release preference indication. In some embodiments, a UE can indicate whether a particular release preference indication is an initial or a subsequent release preference indication. In other words, the UE can indicate whether it previously sent a release preference indication to another network node (i.e., without releasing or being released). The initial/subsequent indication may be a field in the release preference indication. For example, the field being present can indicate that this is a subsequent release preference indication and the field being absent can indicate that this is a first release preference indication.

As discussed above, the UE may indicate in the release preference indication the time T when (or until) the UE expects to leave the first network. In some embodiments, the UE omits the field for the time T when this is an initial release preference indication and includes the field (set to a suitable value) if this is a subsequent release preference indication. The second (or third, etc.) network node receiving this information can determine that the UE will leave the first PLMN at the time indicated by the field when present and at a default release time (e.g., the leaving time period described above) when the field is absent.

In other embodiments, the UE can always include a field indicating the time when (or until) the UE expects to leave the first PLMN. The included field can indicate a default release time when this is an initial release preference indication, and the included field can indicate an actual expected time when this is a subsequent release preference indication.

The first network node may forward the release preference indication to a second network node for a handover procedure (e.g., in network-centric approach shown in FIG. 5). For example, this may be included in a message from the first network node to the second network node during the handover preparation procedure. However, there may be a period between when the handover preparation procedure was initiated (and when the second network node received the release preference indication from the first network node) and the time when the UE receives the handover command. Any release preference indication sent by the UE to the first network node during this period may not be sent/forwarded by the first network node to the second network node.

In some embodiments, the UE may be configured to send a second release preference indication to the second network node only when the time between sending a first release preference indication to the first network node and receiving a handover is less than a threshold. The threshold may be configured by the network or may be predetermined, e.g., by 3GPP specifications. If the handover happened a relatively long time (e.g., two seconds) after the UE send the first release preference indication, it is likely that the first network node has forwarded any/all release preference indications received from the UE during the handover preparation procedure, making the sending of the second release preference indication to the second network node unnecessary. These principles can be applied to a handover from any source node (e.g., first, second, etc.) to any target node (e.g., second, third, etc.).

Various embodiments described above relate to how a second network node in the first PLMN may be informed about the time T when a UE expects to leave the first PLMN. However, the second network node may not always support this feature, e.g., due to legacy software and/or hardware. In some embodiments, when the second network node does not support the release preference indication for the UE, the UE can refrain from leaving the first PLMN at the expected time T. For example, if the UE was being a first network node and sent a release preference indication indicating T=5 seconds at t=0 while being served by the first network node, the UE expects to leave the first PLMN at t=5 seconds. The UE may then get handed over to a second network node at t=3 seconds. If the second network node does not support the release preference indication the UE would not leave the network at time t=5 seconds. However, if the second network node supports the release preference indication, the UE would leave the first network at time t=5 seconds.

For example, the UE can determine whether the second network node supports the release preference indication by an explicit indication in any of the messages received from the second network node during the handover procedure. As another example, in the UE-centric approach, the UE can determine whether or not the second network node supports the release preference indication based on the second network node's response to the release preference indication sent by the UE.

FIG. 7 is a flow diagram for an exemplary procedure for a UE conditional release from a first PLMN, according to various embodiments of the present disclosure. Initially, the UE sends a release preference indication to the first network node (or source node). The release preference indication can indicate that the UE expects to leave the first PLMN (e.g., at T=5 seconds after sending the release preference indication). The UE subsequently is handed over to the second network node (e.g., at t=3 seconds after sending the release preference indication to the first network node). When the UE determines that the release preference indication is supported by the second network node, the UE proceeds with leaving the first PLMN at T=5 seconds after sending the release preference indication. When the UE determines that the release preference indication is not supported by the second network node, the UE refrains from leaving the first PLMN at T=5 seconds after sending the release preference indication.

In some embodiments, after handover to the second network node (or target node), the UE can abort a planned autonomous release procedure from the first PLMN that the UE previously indicated to the first network node (or source node). The UE can abort the release based on the occurrence of the handover. For example, the UE can stop a currently-running timer (also referred to as a "leaving timer" or a "release timer") upon handover, where expiration of the timer would have caused to UE to perform the autonomous release. In such case, the UE may need to send a further release preference indication to the second network node after the handover in order to be released, or to perform an autonomous release procedure after a time indicated by the further release preference indication.

In both network- and UE-centric approaches discussed above, when the UE gets handed over from a first network node to a second network node, the UE may allow a currently-running timer (e.g., the leaving or release timer mentioned above), which was initiated when the UE was connected to the first network node, to continue to run after the UE is connected to the second network node. In other words, the UE should not re-start this timer when applying a configuration provided by the second network node upon handover.

For instance, the second network node may, upon handover, reconfigure the timer value. However, the UE should not apply the newly configured timer value (e.g., to re-initiate the timer) but rather keep its current timer running. If the UE is later moved by the second network node to RRC_INACTIVE, the UE can store the new timer value provided by the second network node and apply it once its connection is resumed and the UE transitions back to RRC_CONNECTED.

The embodiments described above can be further illustrated with reference to FIGS. 8-10, which show exemplary methods (e.g., procedures) for a UE, a first network node, and a second network node, respectively. In other words, various features of operations described below correspond to various embodiments described above. These exemplary methods can be used cooperatively to provide various exemplary benefits and/or advantages. Although FIGS. 8-10 show specific blocks in a particular order, the operations of the respective methods can be performed in different orders than shown and can be combined and/or divided into blocks having different functionality than shown. Optional blocks or operations are indicated by dashed lines.

In particular, FIG. 8 shows a flow diagram of an exemplary method (e.g., procedure) for a UE configured with user credentials for a plurality of PLMNs, according to various embodiments of the present disclosure. The exemplary method can be performed by a UE (e.g., wireless device) such as described elsewhere herein.

The exemplary method can include operations of block 820, where while registered in first and second PLMNs and in a connected state for the first PLMN, the UE can transmit to a first network node in the first PLMN a first indication that the UE wants to enter a reduced-energy state for the first PLMN. The exemplary method can also include operations of blocks 830-840, where the UE can initiate a timer upon transmitting the first indication and subsequently perform a handover to a second network node in the first PLMN. The exemplary method can also include operations of block 870, where the UE can perform one or more of the following:

transmitting to the second network node in the first PLMN a second indication that the UE wants to enter the reduced-energy state for the first PLMN; and stopping the timer.

In some embodiments, the reduced-energy state for the first PLMN is one of the following: RRC_IDLE; RRC_INACTIVE; or RRC_IDLE with stored context. In some embodiments, at least one of the first indication and the second indication is included in a (UEAssistanceInformation message.

In some embodiments, the exemplary method can also include operations of block 810, where the UE can receive from the first network node in the first PLMN a timer value in an RRCReconfiguration message or an RRCResume message. The timer is initiated (e.g., in block 830) to the received timer value. In some of these embodiments, the timer value can be included in a series of nested information elements for a multi-SIM configuration. In some embodiments In some embodiments, when the UE transmits the indication but does not stop the timer, the second indication indicates one of the following: a time remaining on the leaving timer, a time since the UE sent the first indication, or an absolute time when the UE expects to enter the reduced-energy state for the first PLMN. In other embodiments, when the UE stops the leaving timer and transmits the second indication, the second indication indicates one of the following: the first timer value, or an absolute time when the UE expects to enter the reduced-energy state for the first PLMN.

In some embodiments, the exemplary method can also include the operations of block 890, where the UE can enter the reduced-energy state for the first PLMN in response to any of the following: expiration of the timer, and a message received from the second network node while the timer is running. More specifically, the message indicates that the UE should enter the reduced-energy state for the first PLMN.

In some embodiments, the exemplary method can also include the operations of blocks 850-860, where the UE can receive a timer value from the second network node while the timer is running and refrain from reinitiating the timer based on the timer value received from the second network node.

In some embodiments, the exemplary method can also include the operations of block 880, where based on determining that the second network node does not support indications that UEs want to enter a reduced-energy state for the first PLMN, the UE can stop the timer and refrain from entering the reduced-energy state. In some embodiments, determining that the second network node does not support indications that UEs want to enter a reduced-energy state for the first PLMN can be based on one of the following: a message received from the second network node during the handover; or a message received from the second network in response to the second indication (e.g., in block 870).

In some embodiments, performing the handover in block 840 can include the operations of sub-block 841, where the UE can receive a handover command from the second network node. In such embodiments, transmitting the second indication (e.g., in block 870) can be based on a period between transmitting the first indication (e.g., in block 820) and receiving the handover command (e.g., in sub-block 841) being less than a threshold.

In some embodiments, the first indication indicates that it is an initial indication that the UE wants to enter a reduced-energy state for the first PLMN, and the second indication indicates that it is a subsequent indication that the UE wants to enter a reduced-energy state for the first PLMN. In some of these embodiments, the second indication indicates that it is a subsequent indication by including a field that indicates a time when the UE expects to enter the reduced-energy state for the first PLMN, while the first indication indicates that it is an initial indication by omitting the field.

In other of these embodiments, the second indication indicates that it is a subsequent by including a field that indicates an actual time when the UE expects to enter the reduced-energy state for the first PLMN, while the first indication indicates that it is an initial indication by including a field that indicates a default time when the UE expects to enter the reduced-energy state for the first PLMN.

In addition, FIG. 9 shows a flow diagram of an exemplary method (e.g., procedure) for a first network node configured to operate in a first PLMN and to manage a UE configured with user credentials for a plurality of PLMNs, according to various embodiments of the present disclosure. The exemplary method can be performed by a network node (e.g., base station, eNB, gNB, ng-eNB, en-gNB, etc., or components thereof) such as described elsewhere herein.

The exemplary method can include operations of block 920, where while the UE is registered in the first PLMN and in a second PLMN, and in a connected state for the first PLMN, the first network node can receive from the UE a first indication that the UE wants to enter a reduced-energy state for the first PLMN. The exemplary method can also include operations of block 930, where the first network node can send to a second network node in the first PLMN a request to handover the UE to the second network node. The request includes a second indication that the UE wants to enter the reduced-energy state for the first PLMN. The exemplary method can also include operations of blocks 940-950, where the first network node can receive from the second network node a confirmation of the handover request and send to the UE a command to handover to the second network node.

In some embodiments, the reduced-energy state for the first PLMN is one of the following: RRC_IDLE; RRC_I-NACTIVE; or RRC_IDLE with stored context.

In some embodiments, the exemplary method can also include operations of block 910, where the first network node can send the UE a timer value in an RRCReconfiguration message or an RRCResume message. In some embodiments, the timer value can be included in a series of nested information elements for a multi-SIM configuration.

In addition, FIG. 10 shows a flow diagram of an exemplary method (e.g., procedure) for a second network node configured to operate in a first PLMN and to manage a UE configured with user credentials for a plurality of PLMNs, according to various embodiments of the present disclosure. The exemplary method can be performed by a network node (e.g., base station, eNB, gNB, ng-eNB, en-gNB, etc., or components thereof) such as described elsewhere herein.

The exemplary method can include operations of block 1010, where the second network node can receive, from a first network node in the first PLMN, a request to handover the UE to the second network node. The UE is registered in the first PLMN and in a second PLMN and is in a connected state for the first PLMN. The exemplary method can also include operations of block 1040, where the second network node can receive, from the UE or from the first network node, a second indication that the UE wants to enter the reduced-energy state for the first PLMN. The exemplary method can also include operations of block 1050, based on the second indication, the second network node can determine a time when the UE expects to enter the reduced-energy state for the first PLMN.

In some embodiments, the reduced-energy state for the first PLMN is one of the following: RRC_IDLE; RRC_I-NACTIVE; or RRC_IDLE with stored context.

In some embodiments, the second indication can be received from the first network node with the handover request. In such embodiments, the operations of blocks 1010 and 1040 can be combined into a single operation.

In other embodiments, the exemplary method can also include the operations of blocks 1020-1030, where the second network node can send to the first network node a confirmation of the handover request and perform a handover procedure with the UE. In such embodiments, the second indication is received from the UE in block 1040 after completion of the handover procedure. In some of these embodiments, the second indication can be included in a UEAssistance Information message.

In some of these embodiments, performing the handover procedure with the UE in block 1030 can include the operations of sub-block 1031, where the second network node can send a handover command to the UE. In such embodiments, the second indication can be received from the UE based on the period between the following being less than a threshold: the UE's transmission to the first network node of a first indication that the UE wants to enter a reduced-energy state for the first PLMN (e.g., as described above in relation to FIGS. 8-9), and the UE's reception of the handover command sent in sub-block 1031.

In some embodiments, the second indication indicates one of the following:

a time remaining on a timer (e.g., leaving timer, release timer, etc.) running at the UE;

an initial value for the timer that was configured by the first network node;

a time since the UE sent the first network node a first indication that the UE wants to enter the reduced-energy state for the first PLMN; or.

an absolute time when the UE expects to enter the reduced-energy state for the first PLMN.

In some embodiments, the exemplary method can also include the operations of block 1060, where the second network node can one or more of the following to the UE before the determined time: a message indicating that the UE should enter the reduced-energy state for the first PLMN; and a timer value for initializing a timer at the UE. In some cases, the UE may refrain from applying the timer value, as discussed above in relation to FIG. 8.

In some embodiments, the second network node indicates to the UE that the second network node supports indications that UEs want to enter a reduced-energy state for the first PLMN, based on one of the following: a message sent to the UE during the handover; or a message sent to the UE in response to the second indication received from the UE (e.g., in block 1040).

In some embodiments, the second indication indicates whether it is an initial indication that the UE wants to enter the reduced-energy state for the first PLMN, or a subsequent indication that the UE wants to enter the reduced-energy state for the first PLMN. In some of these embodiments, the second indication indicates that it is a subsequent indication by including a field that indicates a time when the UE expects to enter the reduced-energy state for the first PLMN, while the second indication indicates that it is an initial indication by omitting the field. For example, the field can be the time when the UE expects to enter the reduced-energy state for the first PLMN.

In other of these embodiments, the second indication indicates that it is a subsequent indication by including a field that indicates an actual time when the UE expects to enter the reduced-energy state for the first PLMN, while the second indication indicates that it is an initial indication by including a field that indicates a default time when the UE expects to enter the reduced-energy state for the first PLMN.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
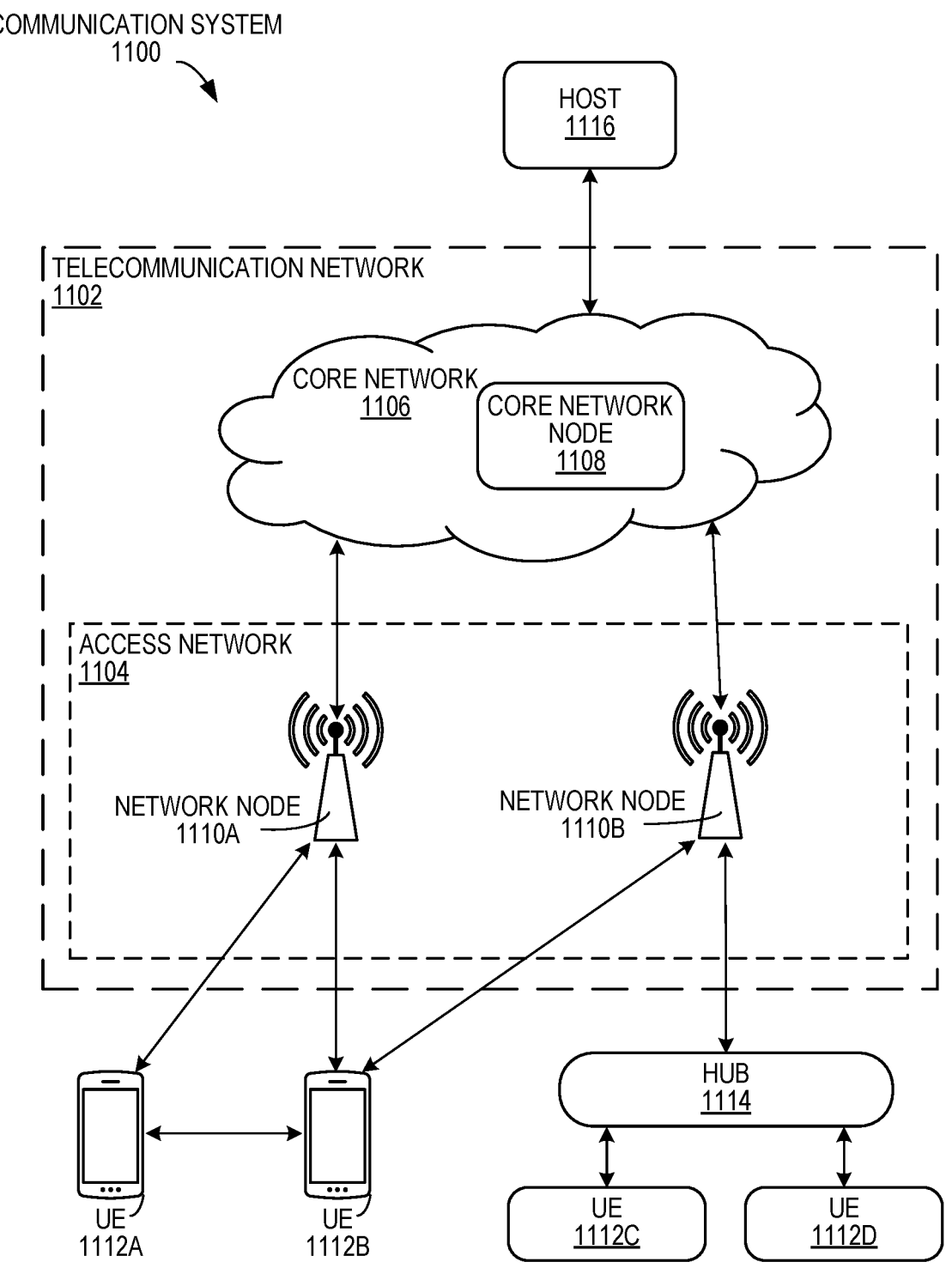
FIG. 11 shows a communication system according to various embodiments of the present disclosure.

FIG. 11 shows an example of a communication system 1100 in accordance with some embodiments. In this example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110a and 1110b (one or more of which may be generally referred to as network nodes 1110), or any other similar 3GPP access node or non-3GPP access point. The network nodes 1110 facilitate direct or indirect connection of UEs, such as by connecting UEs 1112a, 1112b, 1112c, and 1112d (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/ or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112c and/or 1112d) and network nodes (e.g., network node 1110b). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110b. The hub 1114 may also allow for a different communication scheme and/or schedule between the hub 1114 and UEs (e.g., UE 1112c and/or 1112d), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110b. In other embodiments, the hub 1114 may be a non-dedicated hub—that is, a device which is capable of operating to route communications between the UEs and network node 1110b, but which is additionally capable of operating as a communication start and/or end point for certain data channels.

Figure 12:
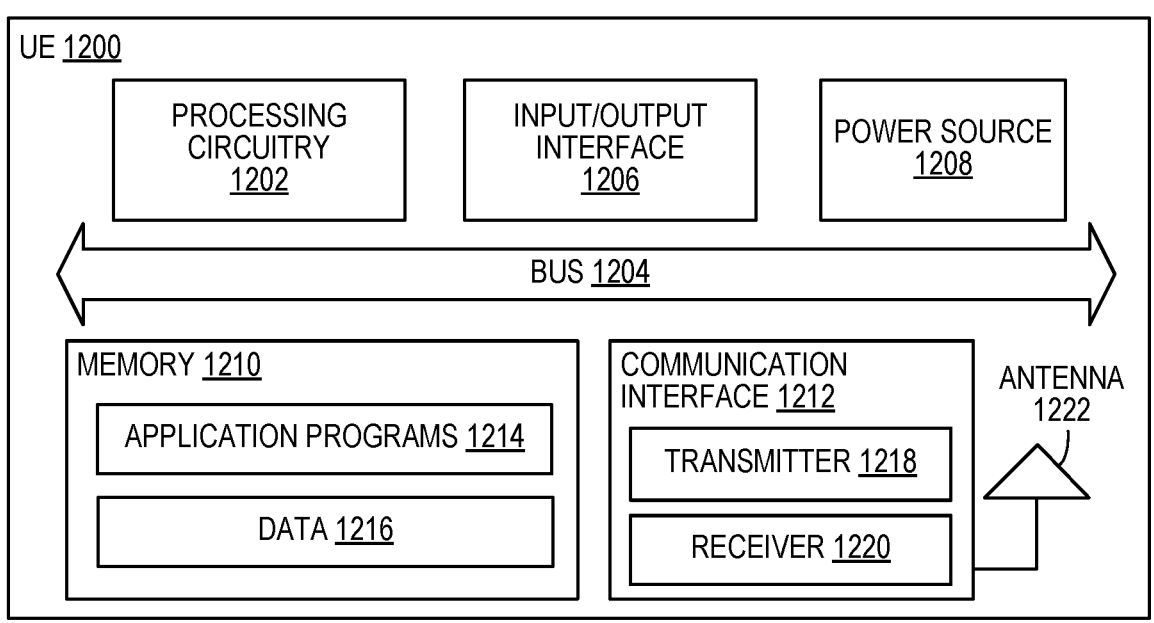
FIG. 12 shows a UE according to various embodiments of the present disclosure.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
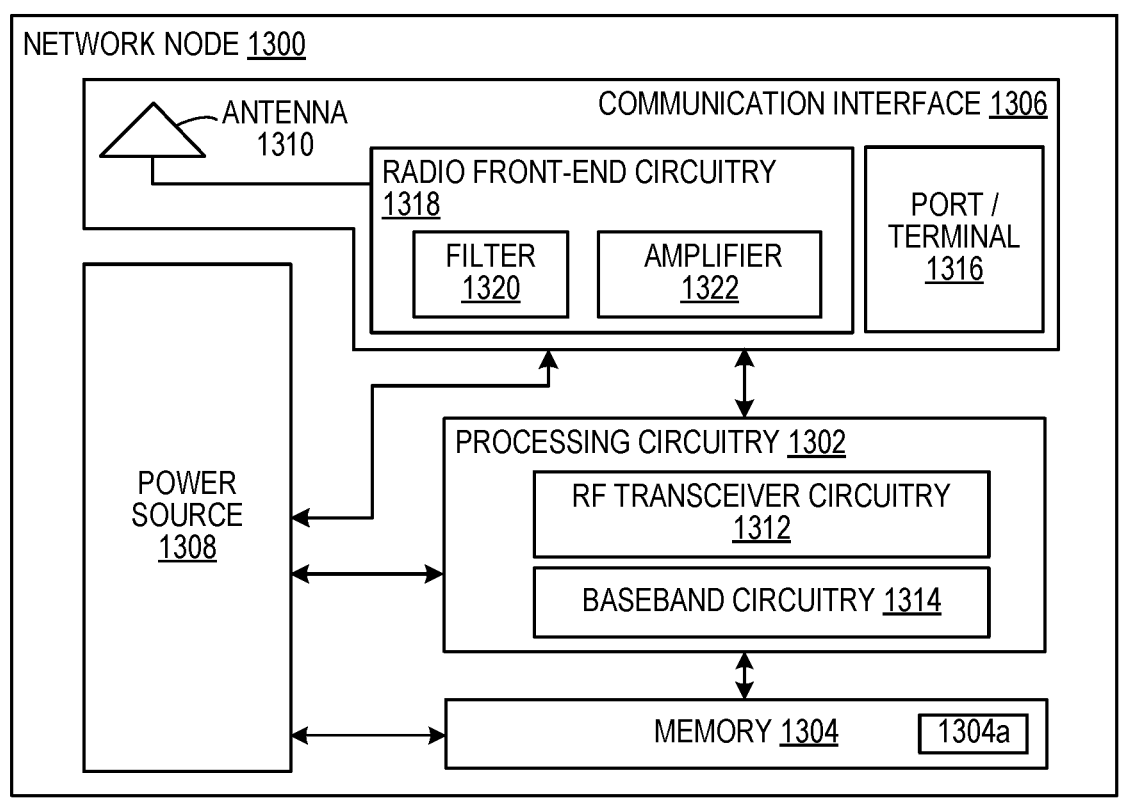
FIG. 13 shows a network node according to various embodiments of the present disclosure.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions (collectively denoted computer program product 1304a) capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
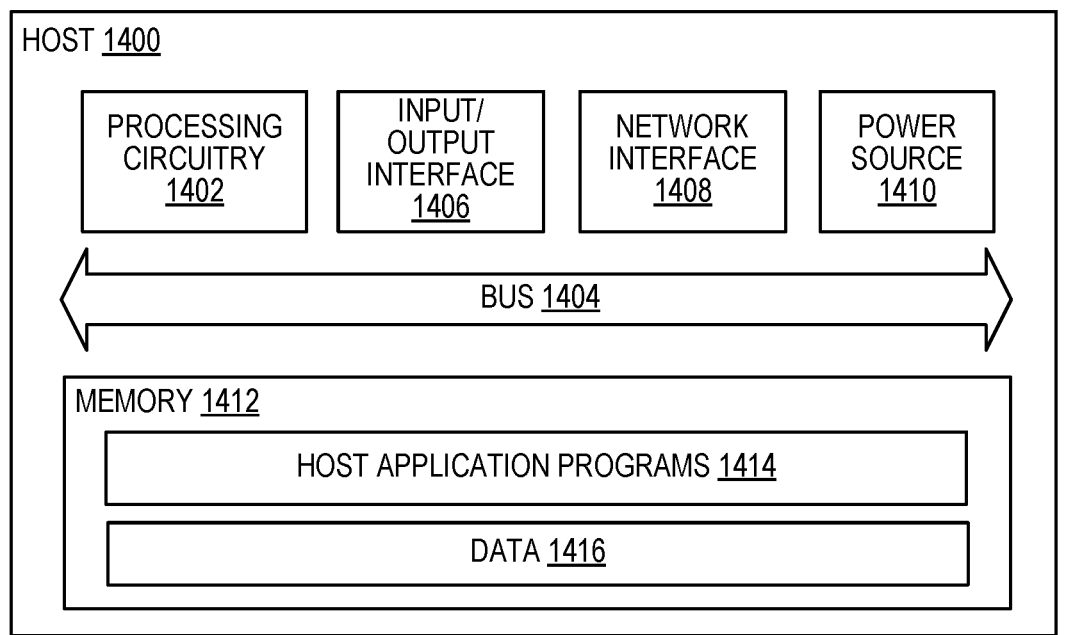
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
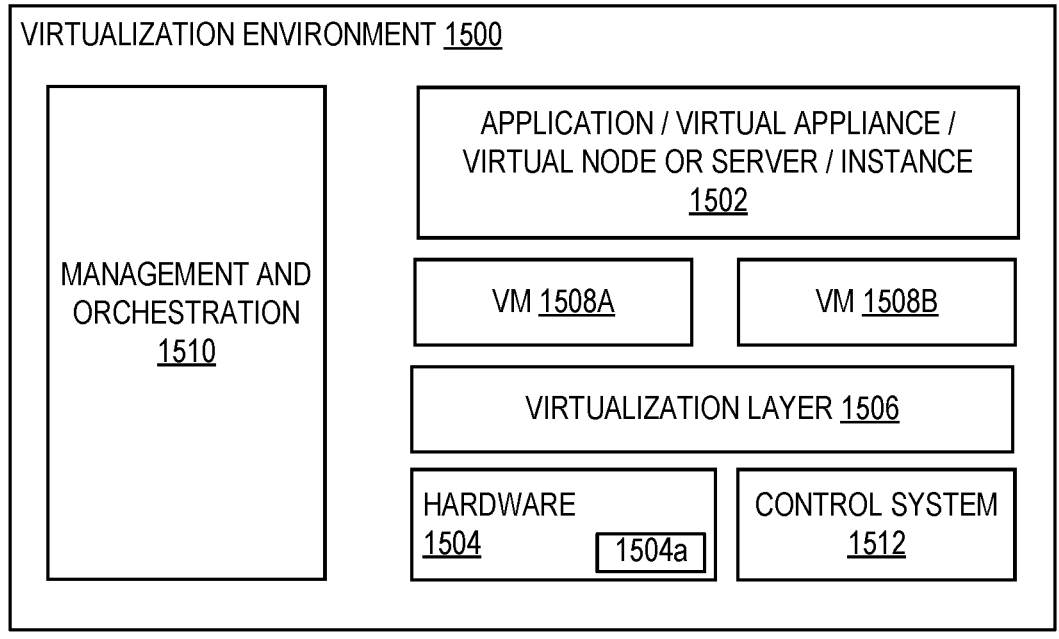
FIG. 15 is a block diagram of a virtualization environment in which functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1504 includes processing circuitry, memory that stores software and/or instructions (collectively denoted computer program product 1504a) executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508a and 1508b (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g., such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
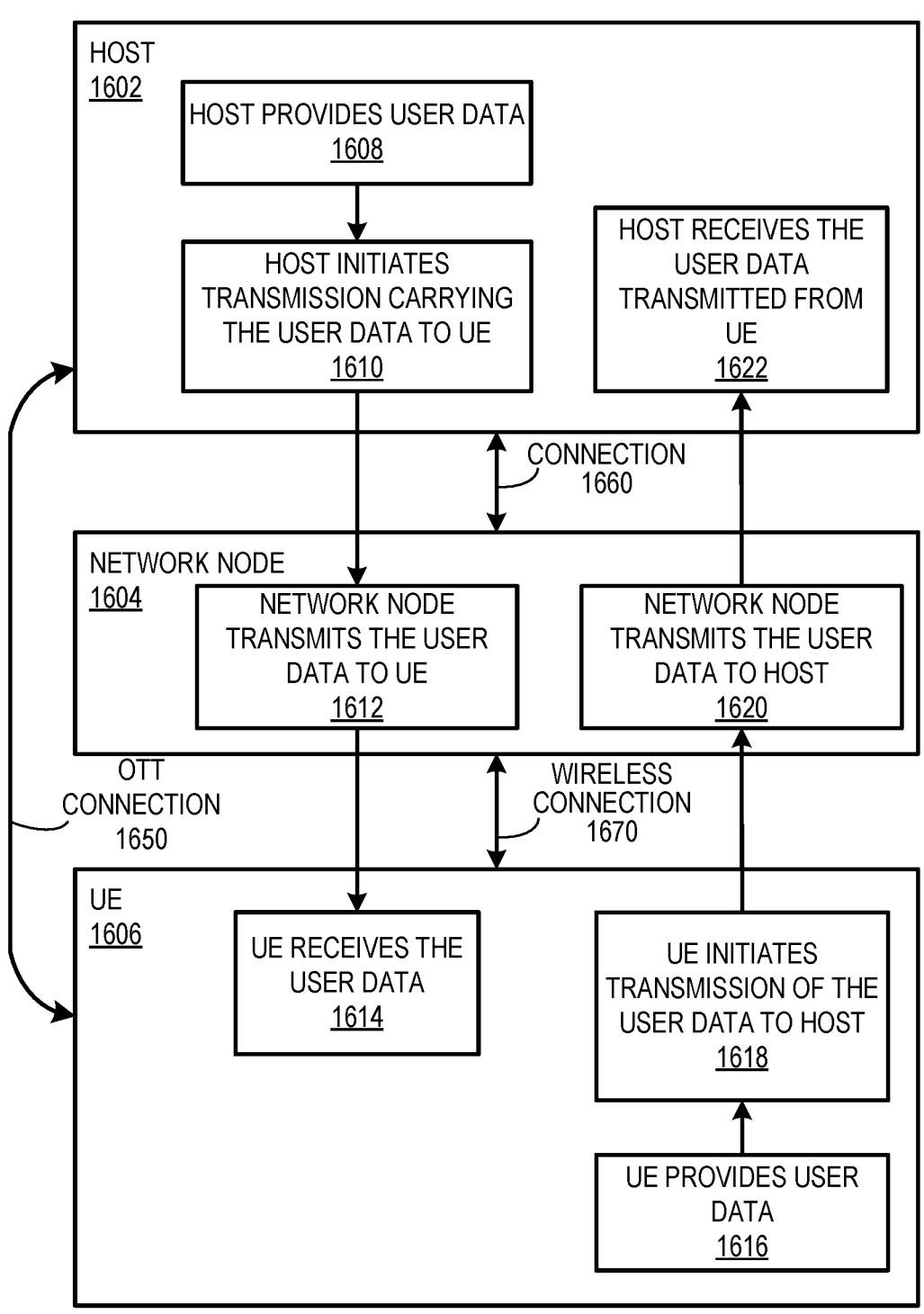
FIG. 16 illustrates communication between a host computing system, a network node, and a UE via multiple connections, at least one of which is wireless, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112a of FIG. 11 and/or UE 1200 of FIG. 12), network node (such as network node 1110a of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1306 using the OTT connection 1350, in which the wireless connection 1370 forms the last segment. More precisely, embodiments described herein embodiments described herein can avoid and/or prevent misunderstandings and/or state mismatches between UEs and network nodes after handovers, which can facilitate correct and efficient operation of UEs and networks. In this manner, embodiments can reduce or prevent loss of user data and/or excess latency for a UE to receive and respond to network paging, which can happen when such misunderstandings and/or state mismatches occur. At a high level, embodiments facilitate more consistent operation of UEs and networks, which increases the value of OTT services provided to UEs over such networks to both end users and OTT service providers.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above or by supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

The techniques and apparatus described herein include, but are not limited to, the following enumerated examples:

A1. A method for a user equipment (UE) configured with user credentials for a plurality of public land mobile networks (PLMNs), the method comprising:

while registered in first and second PLMNs and connected to a first network node in the first PLMN, transmitting to the first network node a first indication that the UE wants to enter a reduced-energy state for the first PLMN;

initiating a leaving timer upon transmitting the first indication;

subsequently performing a handover to a second network node in the first PLMN; and performing one or more of the following:

transmitting to the second network node a second indication that the UE wants to enter the reduced-energy state for the first PLMN; and stopping the leaving timer.

A2. The method of embodiment A1, wherein the reduced-energy state for the first PLMN is one of the following: RRC_IDLE; RRC_INACTIVE; or RRC_IDLE with stored context.

A3. The method of any of embodiments A1-A2, further comprising receiving a timer value from the first network node in an RRCReconfiguration message or an RRCResume message, wherein the leaving timer is initiated to the received timer value.

A4. The method of embodiment A3, wherein the timer value is included in a series of nested information elements for a multi-SIM configuration.

A5. The method of any of embodiments A3-A4, wherein when the UE does not stop the leaving timer, the second indication indicates one of the following: a time remaining on the leaving timer, a time since the UE sent the first indication, or an absolute time when the UE expects to enter the reduced-energy state for the first PLMN.

A6. The method of any of embodiments A3-A4, wherein when the UE stops the leaving timer, the second indication indicates one of the following: the timer value, or an absolute time when the UE expects to enter the reduced-energy state for the first PLMN.

A7. The method of any of embodiments A1-A6, wherein at least one of the first indication and the second indication is included in a UEAssistanceInformation message.

A8. The method of any of embodiments A1-A7, further comprising entering the reduced-energy state for the first PLMN in response to any of the following:

a message received from the second network node while the leaving timer is running, the message indicating that the UE should enter the reduced-energy state for the first PLMN; and expiration of the leaving timer.

A9. The method of any of embodiments A1-A8, further comprising:

receiving a timer value from the second network node while the leaving timer is running; and refraining from reinitiating the leaving timer based on the timer value received from the second network node.

A10. The method of any of embodiments A1-A9, further comprising, based on determining that the second network node does not support indications that UEs want to enter a reduced-energy state for the first PLMN, stopping the leaving timer and refraining from entering the reduced-energy state.

A11. The method of embodiment A10, wherein determining that the second network node does not support indications that UEs want to enter a reduced-energy state for the first PLMN is based on one of the following:

a message received from the second network node during the handover; or a message received from the second network in response to the second indication.

A12. The method of any of embodiments A1-A11, wherein:

performing the handover to the second network node comprises receiving a handover command from the second network node; and transmitting the second indication is based on the period between transmitting the first indication and receiving the handover command being less than a threshold.

A13. The method of any of embodiments A1-A12, wherein:

the first indication indicates that it is an initial indication that the UE wants to enter a reduced-energy state for the first PLMN; and the second indication indicates that it is a subsequent indication that the UE wants to enter a reduced-energy state for the first PLMN.

A14. The method of embodiment A13, wherein:
the second indication includes a first field, indicating that it is a subsequent indication; and
the first indication excludes the first field, indicating that it is an initial indication.

A15. The method of embodiment A14, wherein the first field is a time when the UE expects to enter the reduced-energy state for the first PLMN.

A16. The method of embodiment A13, wherein:
the second indication includes an actual time when the UE expects to enter the reduced-energy state for the first PLMN, and
the first indication includes a default time when the UE expects to enter the reduced-energy state for the first PLMN.

B1. A method for a first network node, of a first public land mobile networks (PLMN), to manage a user equipment (UE) configured with user credentials for a plurality of PLMNs, the method comprising:
while the UE is registered in the first PLMN and in a second PLMN, and connected to the first network node in the first PLMN, receiving from the UE a first indication that the UE wants to enter a reduced-energy state for the first PLMN;
sending, to a second network node in the first PLMN, a request to handover the UE to the second network node, wherein the request includes a second indication that the UE wants to enter the reduced-energy state for the first PLMN;
receiving, from the second network node, a confirmation of the handover request; and
sending, to the UE, a command to handover to the second network node.

B2. The method of embodiment B1, wherein the reduced-energy state for the first PLMN is one of the following: RRC_IDLE; RRC_INACTIVE; or RRC_IDLE with stored context.

B3. The method of any of embodiments B1-B2, further comprising sending the UE a timer value in an RRCReconfiguration message or an RRCResume message.

B4. The method of embodiment B3, wherein the timer value is included in a series of nested information elements for a multi-SIM configuration.

B5. The method of any of embodiments B1-B4, wherein the first indication is included in a UEAssistanceInformation message.

C1. A method for a second network node, of a first public land mobile networks (PLMN), to manage a user equipment (UE) configured with user credentials for a plurality of PLMNs, the method comprising:
receiving, from a first network node in the first PLMN, a request to handover the UE to the second network node, wherein the UE is registered in the first PLMN and in a second PLMN and is connected to the first PLMN via the first network node;
receiving, from the UE or from the first network node, a second indication that the UE wants to enter the reduced-energy state for the first PLMN; and
based on the second indication, determining a time when the UE expects to enter the reduced-energy state for the first PLMN.

C2. The method of embodiment C1, wherein the reduced-energy state for the first PLMN is one of the following: RRC_IDLE; RRC_INACTIVE; or RRC_IDLE with stored context.

C3. The method of any of embodiments A1-A2, wherein the second indication is received from the first network node with the handover request.

C4. The method of any of embodiments A1-A2, further comprising:
sending, to the first network node, a confirmation of the handover request; and
performing a handover procedure with the UE,
wherein the second indication is received from the UE after completion of the handover procedure.

C5. The method of embodiment C4, wherein the second indication is included in a UEAssistanceInformation message.

C6. The method of any of embodiments C4-C5, wherein:
performing the handover procedure with the UE comprises sending a handover command to the UE; and
the second indication is received from the UE based on the period between the following being less than a threshold:
the UE's previous transmission of a first indication to the first network node; and
the UE's reception of the handover command.

C7. The method of any of embodiments C1-C6, wherein the second indication indicates one of the following:
a time remaining on a leaving timer running at the UE,
an initial value for the leaving timer that was configured by the first network node,
a time since the UE sent the first network node a first indication that the UE wants to enter the reduced-energy state for the first PLMN, or
an absolute time when the UE expects to enter the reduced-energy state for the first PLMN.

C8. The method of any of embodiments C1-C7, further comprising sending, to the UE before the determined time, a message indicating that the UE should enter the reduced-energy state for the first PLMN.

C9. The method of any of embodiments C1-C8, further comprising sending, to the UE before the determined time, a timer value for initializing a leaving timer at the UE.

C10. The method of any of embodiments C1-C9, wherein the second network node indicates, to the UE, support for indications that UEs want to enter a reduced-energy state for the first PLMN based on one of the following:
a message sent to the UE during the handover; or
a message sent to the UE in response to the second indication received from the UE.

C11. The method of any of embodiments C1-C10, wherein the second indication indicates that it is one of the following:
an initial indication that the UE wants to enter the reduced-energy state for the first PLMN; or
a subsequent indication that the UE wants to enter the reduced-energy state for the first PLMN.

C12. The method of embodiment C11, wherein:
the second indication indicates that it is a subsequent indication based on a first field being included; and
the second indication indicates that it is an initial indication based on the first field not being included.

C13. The method of embodiment C12, wherein the first field is the time when the UE expects to enter the reduced-energy state for the first PLMN.

C14. The method of embodiment C11, wherein:

the second indication indicates that it is a subsequent indication based on indicating an actual time when the UE expects to enter the reduced-energy state for the first PLMN, and the second indication indicates that it is an initial indication based on indicating a default time when the UE expects to enter the reduced-energy state for the first PLMN.

D1. A user equipment (UE) configured with user credentials for a plurality of public land mobile networks (PLMNs), the UE comprising:

communication interface circuitry configured to communicate with network nodes in first and second PLMNs; and processing circuitry operatively coupled to the communication interface circuitry, whereby the processing circuitry and the communication interface circuitry are configured to perform operations corresponding to the methods of any of embodiments A1-A16.

D2. A user equipment (UE) configured with user credentials for a plurality of public land mobile networks (PLMNs), the UE being further configured to perform operations corresponding to the methods of any of embodiments A1-A16.

D3. A non-transitory, computer-readable medium storing computer-executable instructions that, when executed by processing circuitry of a configured with user credentials for a plurality of public land mobile networks (PLMNs), configure the UE to perform operations corresponding to the methods of any of embodiments A1-A16.

D4. A computer program product comprising computer-executable instructions that, when executed by processing circuitry of a configured with user credentials for a plurality of public land mobile networks (PLMNs), configure the UE to perform operations corresponding to the methods of any of embodiments A1-A16.

E1. A first network node, of a first public land mobile networks (PLMN), arranged to manage a user equipment (UE) configured with user credentials for a plurality of PLMNs, the first network node comprising:

communication interface circuitry configured to communicate with the UE and with a second network node of the first PLMN; and processing circuitry operatively coupled to the communication interface circuitry, whereby the processing circuitry and the communication interface circuitry are configured to perform operations corresponding to the methods of any of embodiments B1-B5.

E2. A first network node, of a first public land mobile networks (PLMN), arranged to manage a user equipment (UE) configured with user credentials for a plurality of PLMNs, the first network node being further arranged to perform operations corresponding to the methods of any of embodiments B1-B5.

E3. A non-transitory, computer-readable medium storing computer-executable instructions that, when executed by processing circuitry of a first network node arranged to manage a user equipment (UE) configured with user credentials for a plurality of public land mobile networks (PLMNs), configure the first network node to perform operations corresponding to the methods of any of embodiments B1-B5.

E4. A computer program product comprising computer-executable instructions that, when executed by processing circuitry of a first network node arranged to manage a user equipment (UE) configured with user credentials for a plurality of public land mobile networks (PLMNs), configure the first network node to perform operations corresponding to the methods of any of embodiments B1-B5.

F1. A second network node, of a first public land mobile networks (PLMN), arranged to manage a user equipment (UE) configured with user credentials for a plurality of PLMNs, the second network node comprising:

communication interface circuitry configured to communicate with the UE and with a first network node of the first PLMN; and processing circuitry operatively coupled to the communication interface circuitry, whereby the processing circuitry and the communication interface circuitry are configured to perform operations corresponding to the methods of any of embodiments C1-C14.

F2. A second network node, of a first public land mobile networks (PLMN), arranged to manage a user equipment (UE) configured with user credentials for a plurality of PLMNs, the second network node being further arranged to perform operations corresponding to the methods of any of embodiments C1-C14.

F3. A non-transitory, computer-readable medium storing computer-executable instructions that, when executed by processing circuitry of a second network node arranged to manage a user equipment (UE) configured with user credentials for a plurality of public land mobile networks (PLMNs), configure the second network node to perform operations corresponding to the methods of any of embodiments C1-C14.

F4. A computer program product comprising computer-executable instructions that, when executed by processing circuitry of a second network node arranged to manage a user equipment (UE) configured with user credentials for a plurality of public land mobile networks (PLMNs), configure the second network node to perform operations corresponding to the methods of any of embodiments C1-C14.

The invention claimed is:

1. A method for a user equipment (UE) configured with user credentials for first and second public land mobile networks (PLMNs), the method comprising:

while registered in the first and second PLMNs and in a connected state for the first PLMN, transmitting to a first network node in the first PLMN a first indication that the UE wants to enter a reduced-energy state for the first PLMN;

initiating a timer upon transmitting the first indication;

subsequently performing a handover to a second network node in the first PLMN; and performing one or more of the following:

stopping the timer; and transmitting to the second network node in the first PLMN a second indication that the UE wants to enter the reduced-energy state for the first PLMN.

2. The method of claim 1, wherein the reduced-energy state for the first PLMN is one of the following: RRC_IDLE, RRC_INACTIVE, or RRC_IDLE with stored context.

3. The method of claim 1, further comprising receiving from the first network node in the first PLMN a first timer value in an RRCReconfiguration message or an RRCResume message, wherein the timer is initiated to the first timer value.

4. The method of claim 3, wherein the first timer value is included in a series of nested information elements for a multiple subscriber identity module (multi-SIM) configuration.

5. The method of claim 1, wherein at least one of the first indication and the second indication is transmitted in a UEAssistanceInformation message.

6. The method of claim 1, further comprising entering the reduced-energy state for the first PLMN in response to any of the following:

a message received from the second network node while the timer is running, wherein the message indicates that the UE should enter the reduced-energy state for the first PLMN; and expiration of the timer.

7. The method of claim 1, further comprising:

receiving a second timer value from the second network node while the timer is running; and refraining from reinitiating the timer to the second timer value.

8. The method of claim 1, further comprising, based on determining that the second network node does not support indications that UEs want to enter a reduced-energy state for the first PLMN, stopping the timer and refraining from entering the reduced-energy state.

9. The method of claim 8, wherein determining that the second network node does not support indications that UEs want to enter a reduced-energy state for the first PLMN is based on one of the following:

a message received from the second network node during the handover; or a message received from the second network in response to the second indication.

10. The method of claim 1, wherein:

performing the handover to the second network node comprises receiving a handover command from the second network node; and transmitting the second indication is based on a period between transmitting the first indication and receiving the handover command being less than a threshold.

11. The method of claim 1, wherein:

the first indication indicates that it is an initial indication that the UE wants to enter a reduced-energy state for the first PLMN; and the second indication indicates that it is a subsequent indication that the UE wants to enter a reduced-energy state for the first PLMN.

12. A method for a first network node configured to operate in a first public land mobile network (PLMN) and to manage a user equipment (UE) configured with user credentials for the first PLMN and for a second PLMN, the method comprising:

while the UE is registered in the first and second PLMNs, and in a connected state for the first PLMN, receiving from the UE a first indication that the UE wants to enter a reduced-energy state for the first PLMN;

sending to a second network node in the first PLMN a request to handover the UE to the second network node, wherein the request includes a second indication that the UE wants to enter the reduced-energy state for the first PLMN;

receiving from the second network node a confirmation of the handover request; and sending to the UE a command to handover to the second network node.

13. The method of claim 12, wherein the reduced-energy state for the first PLMN is one of the following: RRC_IDLE, RRC_INACTIVE, or RRC_IDLE with stored context.

14. The method of claim 12, further comprising sending the UE a timer value in an RRCReconfiguration message or an RRCResume message.

15. The method of claim 14, wherein the timer value is included in a series of nested information elements for a multiple subscriber identity module (multi-SIM) configuration.

16. The method of claim 12, wherein the first indication is received in a UEAssistanceInformation message.

17. A user equipment (UE) configured with user credentials for first and second public land mobile networks (PLMNs), the UE comprising:

communication interface circuitry configured to communicate with network nodes in the first and second PLMNs; and processing circuitry operatively coupled to the communication interface circuitry, whereby the processing circuitry and the communication interface circuitry are configured to:

while registered in the first and second PLMNs and in a connected state for the first PLMN, transmit to a first network node in the first PLMN a first indication that the UE wants to enter a reduced-energy state for the first PLMN;

initiate a timer upon transmitting the first indication;

subsequently perform a handover to a second network node in the first PLMN; and perform one or more of the following:

stopping the timer; and transmitting to the second network node in the first PLMN a second indication that the UE wants to enter the reduced-energy state for the first PLMN.

18. The UE of claim 17, wherein:

the processing circuitry and the communication interface circuitry are further configured to in response to the first indication, receive from the first network node a timer value in an RRCReconfiguration message or an RRCResume message;

the timer value is included in a series of nested information elements for a multiple subscriber identity module (multi-SIM) configuration; and the timer is initiated to the first timer value.

19. A first network node configured to operate in a first public land mobile network (PLMN) and to manage a user equipment (UE) configured with user credentials for the first PLMN and for a second PLMN, the first network node comprising:

communication interface circuitry configured to communicate with the UE and with a second network node of the first PLMN; and processing circuitry operatively coupled to the communication interface circuitry, whereby the processing circuitry and the communication interface circuitry are configured to:

while the UE is registered in the first PLMN and second PLMNs, and in a connected state for the first PLMN, receive from the UE a first indication that the UE wants to enter a reduced-energy state for the first PLMN;

send to a second network node in the first PLMN a request to handover the UE to the second network node, wherein the request includes a second indication that the UE wants to enter the reduced-energy state for the first PLMN;

receive from the second network node a confirmation of the handover request; and send to the UE a command to handover to the second network node.

20. The first network node of claim 19, wherein:

the processing circuitry and the communication interface circuitry are further configured to, in response to the first indication, send the UE a timer value in an RRCReconfiguration message or an RRCResume message,; and the timer value is included in a series of nested information elements for a multiple subscriber identity module (multi-SIM) configuration.

* * * * *